US008896552B2

(12) United States Patent
Tan et al.

(10) Patent No.: US 8,896,552 B2
(45) Date of Patent: Nov. 25, 2014

(54) GESTURES FOR SELECTING TEXT

(75) Inventors: Weihua Tan, Beijing (CN); Qiliang Chen, Beijing (CN)

(73) Assignee: Google Inc., Mountain View, CA (US)

( * ) Notice: Subject to any disclaimer, the term of this patent is extended or adjusted under 35 U.S.C. 154(b) by 161 days.

(21) Appl. No.: 13/179,893

(22) Filed: Jul. 11, 2011

(65) Prior Publication Data

US 2012/0306772 A1  Dec. 6, 2012

Related U.S. Application Data

(63) Continuation of application No. PCT/CN2011/075243, filed on Jun. 3, 2011.

(51) Int. Cl.
| G06F 3/041 | (2006.01) |
| G06F 3/01 | (2006.01) |
| G06F 3/033 | (2013.01) |
| G06F 3/0488 | (2013.01) |

(52) U.S. Cl.
CPC ................................... *G06F 3/0488* (2013.01)
USPC ............................ 345/173; 715/702; 715/863

(58) Field of Classification Search
USPC ............................ 345/156–184; 715/700–866
See application file for complete search history.

(56) References Cited

U.S. PATENT DOCUMENTS

| 5,825,352 | A * | 10/1998 | Bisset et al. ................... 345/173 |
| 6,891,551 | B2 * | 5/2005 | Keely et al. .................... 715/762 |
| 8,169,414 | B2 * | 5/2012 | Lim ................................ 345/173 |
| 2006/0125803 | A1 * | 6/2006 | Westerman et al. ........... 345/173 |
| 2007/0287494 | A1 * | 12/2007 | You et al. .................... 455/550.1 |
| 2008/0036743 | A1 * | 2/2008 | Westerman et al. ........... 345/173 |
| 2009/0109182 | A1 * | 4/2009 | Fyke et al. ..................... 345/173 |
| 2009/0125848 | A1 * | 5/2009 | Keohane et al. ............... 715/863 |
| 2009/0228792 | A1 * | 9/2009 | van Os et al. ................. 715/702 |
| 2009/0228842 | A1 | 9/2009 | Westerman et al. |
| 2009/0271733 | A1 * | 10/2009 | Noma ............................ 715/784 |

(Continued)

FOREIGN PATENT DOCUMENTS

| CN | 1129889 | 8/1996 |
| CN | 101390036 | 3/2009 |

OTHER PUBLICATIONS

Droid Forums. "'Copy Paste It' app cures your Android copy-and-paste woes." [Retrieved on Dec. 1, 2010]. Retrieved from the Internet <URL: http://www.droidforums.net/forum/droid-news/65866-copy-paste-app-cures-your-android-copy-paste-woes.html> (7 pages).

(Continued)

*Primary Examiner* — Amr Awad
*Assistant Examiner* — Roberto Flores
(74) *Attorney, Agent, or Firm* — Fish & Richardson P.C.

(57) ABSTRACT

In general, the subject matter described in this specification can be embodied in methods, systems, and program products for selecting text using a touchscreen display of a computing device. A computing device identifies physical contact between multiple fingers and the touchscreen display at a starting location, wherein the identifying is in distinction to identifying physical contact between a single finger and the touchscreen display. The computing device determines that the physical contact persists during movement of the physical contact from the starting location to an ending location. The computing device determines that the physical contact was interrupted at the ending location. The computing device identifies that text displayed between the starting location and the ending location is text that has been selected by a user of the computing device.

12 Claims, 9 Drawing Sheets

(56) References Cited

U.S. PATENT DOCUMENTS

| | | | | |
|---|---|---|---|---|
| 2010/0085314 | A1* | 4/2010 | Kwok | 345/173 |
| 2010/0088653 | A1* | 4/2010 | Yach et al. | 715/863 |
| 2010/0110017 | A1* | 5/2010 | Lee | 345/173 |
| 2010/0171713 | A1* | 7/2010 | Kwok et al. | 345/173 |
| 2010/0235726 | A1* | 9/2010 | Ording et al. | 715/234 |
| 2010/0235793 | A1* | 9/2010 | Ording et al. | 715/863 |
| 2010/0245261 | A1* | 9/2010 | Karlsson | 345/173 |
| 2010/0289757 | A1* | 11/2010 | Budelli | 345/173 |
| 2010/0293460 | A1 | 11/2010 | Budelli | |
| 2010/0313126 | A1* | 12/2010 | Jung et al. | 715/702 |
| 2011/0234503 | A1* | 9/2011 | Fitzmaurice et al. | 345/173 |
| 2011/0260962 | A1* | 10/2011 | Benko et al. | 345/156 |
| 2011/0310026 | A1* | 12/2011 | Davis et al. | 345/173 |
| 2012/0019452 | A1* | 1/2012 | Westerman | 345/173 |
| 2012/0127086 | A1* | 5/2012 | Li | 345/173 |
| 2012/0139844 | A1* | 6/2012 | Ramstein et al. | 345/173 |
| 2012/0144298 | A1* | 6/2012 | Karlsson | 715/702 |
| 2012/0311507 | A1* | 12/2012 | Murrett et al. | 715/863 |

OTHER PUBLICATIONS

Everything iCafe. "Did anyone else notice the two finger trick with copy and paste?" [Retrieved on Jul. 11, 2011]. Retrieved from the Internet <URL: http://www.everythingicafe.com/forum/threads/did-anyone-else-notice-the-two-finger-trick-with-copy-and-paste.44414/> (5 pages).

Mitch—BlackBerry Tips. "BlackBerry Storm: Highlight, Cut/Copy and Paste Text." Nov. 23, 2008 [Retrieved on Dec. 1, 2010]. Retrieved from the Internet <URL: http://www.technipages.com/blackberry-storm-highlight-cut-copy-and-paste-text.html multitouch text selection with BlackBerry Storm> (3 pages).

Ritescript. "ritePen 4.0 User Manual." Mountain View, CA; 2009 [Retrieved on Dec. 1, 2010]. Retrieved from the Internet <URL: http://www.ritescript.com/Manuals/ritePenManual.aspx#multitouch> (43 pages).

Roth, Volker and Thea Turner. "Bezel Swipe: Conflict-Free Scrolling and Multiple Selection on Mobile Touch Screen Devices." Palo Alto, CA; 2009. (4 pages).

The Windows Club. "Touch Gestures in Windows 7." Oct. 18, 2009 [Retrieved on Dec. 1, 2010]. Retrieved from the Internet <URL: http://www.thewindowsclub.com/touch-gestures-in-windows-7 multitouch text selection with Windows 7> (6pages).

Trautschold, Martin and Gary Mazo. "iPhone 4 Made Simple." pp. 93-94. New York, NY; 2010. (2 pages).

XDADevelopers. "[APP] Copy/Past Beta—Selecting Text Using OCR (Dec. 11, 2010)." [Retrieved on Mar. 9, 2011]. Retrieved from the Internet <URL: http://forum.xda-developers.com/showthread.php?t=846089> (8 pages).

Authorized Officer Y. Tang. International Search Report and Written Opinion in International Application No. PCT/CN2011/075243, mailed Mar. 15, 2012, 12 pages.

* cited by examiner

GESTURES FOR SELECTING TEXT

CROSS-REFERENCE TO RELATED APPLICATION

This application claims benefit under 35 U.S.C. §120 of International Application No. PCT/CN2011/075243 having an International Filing Date of Jun. 3, 2011.

TECHNICAL FIELD

This document generally relates to user interfaces.

BACKGROUND

Computing devices can display text and allow users to select portions of the displayed text. For example, a user may use a mouse or a keyboard to highlight a portion of text that is displayed as part of a word processing document or as part of a web page. Once the text has been highlighted, the user may perform an action with the text, for example, by providing a keyboard shortcut or selecting a graphical menu item with a mouse. Example actions include copying and pasting the text, and changing a font style of the selected text.

Mobile devices can provide different user experience from desktop devices. For example, some mobile devices have screens that are smaller than desktop display screens, some mobile devices do not have a mouse, and some mobile devices provide for user input using a touchscreen. A touchscreen can allow a user to provide user input to a mobile device using gestures, for example, hand, finger, or stylus movements across the surface of the device's touchscreen. Such gestures can be used to select text.

SUMMARY

A user may select text that is displayed on a touchscreen display device by physically contacting one or more fingers with the surface of the touchscreen to perform particular gestures. Once the user has performed a gesture, the mobile device may identify a portion of text as selected and may display a visual indication of the portion that has been selected. The user may further contact the touchscreen to perform an action on the text. For example, the user may copy the text by tapping a region of the touchscreen that displays the selected text. In a second example, the user may tap or long press the region of the touchscreen that displays the selected text in order to cause the mobile device to display a menu of actions that can be performed on the text (e.g., text copying, text deletion, text font size change, text font type change, text font emphasis change, and text font color change).

As an alternative to the attached claims and the implementations described in the below description, the present invention could also be described by one of the following implementations:

Implementation 1 is directed to a computer-implemented method for selecting text using a touchscreen display of a computing device. The method comprises: identifying, by a computing device, physical contact between multiple fingers and the touchscreen display at a starting location, wherein the identifying is in distinction to identifying physical contact between a single finger and the touchscreen display; determining, by the computing device, that the physical contact persists during movement of the physical contact from the starting location to an ending location; determining, by the computing device, that the physical contact was interrupted at the ending location; and identifying, by the computing device, text displayed between the starting location and the ending location as being text that has been selected by a user of the computing device.

Implementation 2 is directed to the method of implementation 1. The method further comprises determining, by the computing device, an intermediate location that is offset a predetermined distance from the starting location.

Implementation 3 is directed to the method of implementation 2. The method further comprises displaying, by the computing device and during the movement of the physical contact from the starting location to the ending location after the physical contact has reached or passed the intermediate location, an indication that text between a location of the physical contact and the starting location has been selected. Before the physical contact reached or passed the intermediate location, the computing device did not display the indication that text between the location of the physical contact and the starting location had been selected.

Implementation 4 is directed to the method of any one of implementations 2-3. The computing device is configured so that: (i) interruption of the physical contact after the physical contact has reached or passed the intermediate location causes the computing device to identify that text has been selected; and (ii) interruption of the physical contact before the physical contact has reached or passed the intermediate location causes text selection to be cancelled.

Implementation 5 is directed to the method of implementation 4. The method further comprises determining that the movement of the physical contact reaches or passes the intermediate location, so that the physical contact is not located between the starting location and the intermediate location, and that the movement of the physical contact thereafter returns to the ending location, the ending location being between the starting location and the intermediate location.

Implementation 6 is directed to the method of any one of implementations 4-5. The computing device is configured to not identify that text has been selected by a user of the computing device if the computing device determines that the movement of the physical contact moves a determined tangential distance from a shortest route between the starting location and the intermediate location before the physical contact reaches or passes the intermediate location.

Implementation 7 is directed to the method of implementation 6. The computing device is configured to identify that text of at least portions of multiple displayed lines of text on the touchscreen display has been selected by the user of the device if the physical contact moves the predetermined tangential distance after the physical contact passes the intermediate location.

Implementation 8 is directed to the method of any one of implementations 2-7. The method further comprises displaying, by the touchscreen display and at the intermediate location during the movement of the physical contact, a graphical interface element that was not displayed at the intermediate location before identifying the physical contact at the starting location.

Implementation 9 is directed to the method of any one of implementations 1-8. The method further comprises determining that the multiple fingers remained adjacent during the movement of the physical contact from the starting location to the ending location.

Implementation 10 is directed to the method of any one of implementations 1-9. The method further comprises indicating, by the computing device and on the touchscreen display during the movement of the physical contact, that text between a location of the physical contact and the starting location is selected using a first text selection mode based on the physical contact including a first quantity of one or more fingers; determining, by the computing device and during the movement of the physical contact, that the first quantity of one or more fingers has changed to a second quantity of one or more fingers; and indicating, by the computing device and on the touchscreen display and during the movement of the physical contact in response to determining that the first quantity of one or more fingers has changed to a second quantity of one or more fingers, that text between the location of the physical contact and the starting location is selected using a second text selection mode.

Implementation 11 is directed to the method of implementation 10. The first text selection mode is a text selection mode selected from a group consisting of: (i) a text selection mode that causes text between the location of the physical contact and the starting location to be selected as whole words so that partial words are not indicated as selected during the movement, and (ii) a text selection mode that causes text between the location of the physical contact and the starting location to be selected as individual characters so that partial words are indicated as selected during the movement; and the second text selection mode is the other text selection mode from the group.

Implementation 12 is directed to the method of implementation 10. The first text selection mode is a text selection mode selected from a group consisting of: (i) a text selection mode that causes text between the location of the physical contact and the starting location to be selected as whole words so that partial sentences are indicated as selected during the movement, and (ii) a text selection mode that causes text between the location of the physical contact and the starting location to be selected as whole sentences so that partial sentences are not indicated as selected during the movement; and the second text selection mode is the other text selection mode from the group.

Implementation 13 is directed to the method of any one of implementations 1-12. Identifying text displayed between the starting location and the ending location as being text that has been selected includes identifying: (i) if the physical contact includes a first quantity of fingers, a first partial word that corresponds to the starting location as selected and a second partial word that corresponds to the ending location as selected; and (ii) if the physical contact includes a second quantity of fingers, a first whole word that corresponds to the starting location as selected, even though the starting location corresponds to an intermediate location in the first whole word, and a second whole word that corresponds to the ending location as selected, even though the ending location corresponds to an intermediate location in the second whole word.

Implementation 14 is directed to the method of any one of implementations 1-13. The method further comprises displaying, by the computing device and after determining that the physical contact was interrupted, an indication that text between the starting location and the ending location has been selected; and wherein the computing device is configured so that, subsequent to determining that the physical contact was interrupted: (i) user physical contact at a location of the displayed indication using a single finger causes the computing device to perform a first action; and (ii) user physical contact at a location of the displayed indication using multiple fingers causes the computing device to perform a second action.

Implementation 15 is directed to the method of implementation 14. The first action is one action from a group consisting of: (i) copying the selected text, (ii) deleting the selected text, (iii) cutting the selected text, (iv) pasting over the selected text, and (v) displaying a menu of multiple actions that can be performed using the selected text. The second action is another action from the group.

Implementation 16 is directed to a computer-implemented method for selecting text using a touchscreen display of a computing device. The method comprises identifying, by a computing device, physical contact at a starting location with a touchscreen display; determining, by the computing device, an intermediate location that is offset a predetermined distance from the starting location, wherein the computing device is configured so that: (i) interruption of the physical contact with the touchscreen display after the physical contact has reached or passed the intermediate location causes the computing device to identify that text has been selected, and (ii) interruption of the physical contact with the touchscreen display before the physical contact has reached or passed the intermediate location causes the computing device to cancel text selection; determining, by the computing device, that the physical contact with the touchscreen display has reached or passed the intermediate location without interruption of the physical contact with the touchscreen display; determining, by the computing device, that the physical contact with the touchscreen display was interrupted at the ending location for a first instance greater than a threshold time during a movement of the physical contact; identifying, by the computing device, text displayed between the starting location and the ending location as being text that has been selected by a user of the computing device; and displaying, by the computing device, an indication that the text that is between the starting location and the ending location is text that has been selected by a user of the computing device.

Implementation 17 is directed to the method of implementation 16. The method further comprises indicating, by the computing device and on the touchscreen display during the movement of the physical contact, that text between a location of the physical contact and the starting location is selected using a first text selection mode based on the physical contact including a first quantity of one or more fingers; determining, by the computing device and during the movement of the physical contact, that the first quantity of one or more fingers has changed to a second quantity of one or more fingers; and indicating, by the computing device and on the touchscreen display and during the movement of the physical contact in response to determining that the first quantity of one or more fingers has changed to a second quantity of one or more fingers, that text between the location of the physical contact and the starting location is selected using a second text selection mode.

Implementation 18 is directed to the method of implementation 17. The first text selection mode is a text selection mode selected from a group consisting of: (i) a text selection mode that causes text between the location of the physical contact and the starting location to be selected as individual characters so that partial words are indicated as selected during the movement, (ii) a text selection mode that causes text between the location of the physical contact and the starting location to be selected as whole words so that partial words are not indicated as selected during the movement and so that partial sentences are indicated as selected during the movement, and (iii) a text selection mode that causes text between the location of the physical contact and the starting location to be selected as whole sentences so that partial sentences and partial words are not indicated as selected during the movement; and the second text selection mode is another text selection mode from the group.

Implementation 19 is directed to the method of any one of implementations 16-18. The method further comprises displaying, by the touchscreen display and at the intermediate location during the movement of the physical contact, a graphical interface element that was not displayed at the intermediate location before identifying the physical contact at the starting location.

Other implementations include corresponding computer-readable storage devices storing instructions that, when executed by one or more processing devices, perform operations according to the above-described methods. Other implementations include systems and apparatus that include the described computer-readable storage devices and that are configured to execute the operations using one or more processing devices.

Implementation 20 is directed to a computing device. The computing device comprises one or more programmable processors; and a computer-readable storage device coupled to the one or more programmable processors and having instructions stored therein, which when executed by the one or more programmable processors, causes the one or more programmable processors to perform operations including: identifying physical contact at a starting location between multiple fingers and a touchscreen display; determining that the physical contact persists without interruption during movement of the physical contact from the starting location to the ending location; determining that the physical contact with the touchscreen display was interrupted at the ending location; and identifying text displayed between the starting location and the ending location as being text that has been selected by a user of the computing device.

Particular implementations can, in certain instances, realize one or more of the following advantages. A user may be able to quickly select a portion of text by touching a touchscreen display. Also, gesture constraints may minimize unintentional selections of text by a user. Visual indications of such constraints may also allow a user to understand a gesture that the user must perform to select text. In certain examples, the user can change a level of granularity at which text is selected (e.g., selection by characters, words, sentences, or paragraphs).

The details of one or more implementations are set forth in the accompanying drawings and the description below. Other features, objects, and advantages will be apparent from the description and drawings, and from the claims.

DESCRIPTION OF DRAWINGS

FIG. 1 illustrates a technique for selecting text with a long press by a first finger and a touch by a second finger.

FIG. 2 illustrates a technique for selecting text with a press by two separated fingers.

Like reference symbols in the various drawings indicate like elements.

DETAILED DESCRIPTION

Figure 3:
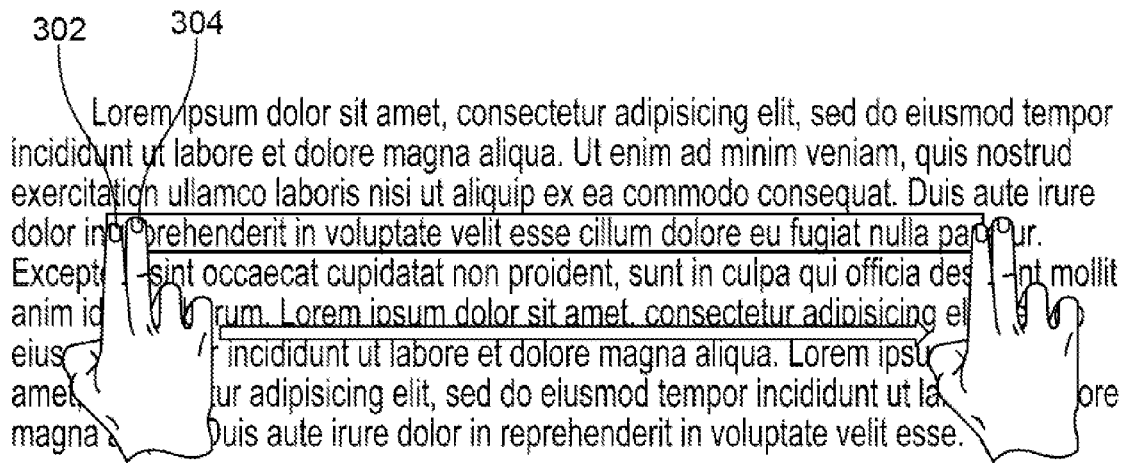
FIG. 3 illustrates a technique for selecting text with a multi-touch swipe gesture.

This document generally describes techniques for selecting text and recognizing that displayed text has been selected. In some techniques, a user may select text that is displayed on a touchscreen of a computing device by swiping one or more of the user's fingers across the text that the user wishes to select. The text that is selected may include text that is included between a beginning location of the swipe gesture and an ending location of the swipe gesture. For text to be selected, the user may need to contact the touchscreen with multiple fingers. For example, text may be selected if the user swipes two adjacent fingers simultaneously across the screen, but not if the user swipes one finger across the screen, swipes two fingers that are not adjacent, or does not swipe two fingers simultaneously.

In some examples, text is only selected if the user swipes for a predetermined distance after beginning contact with the touchscreen. After the user begins a swipe gesture, the touchscreen may display a visual indication of a location of the predetermined distance. Terminating the swipe gesture before the user contacts the visual indication may cause text to not be selected, while terminating the swipe after the user contacts or passes the visual indication may cause selection of the text traversed by the swipe gesture.

For the user to select a portion of text that is shorter than the predetermined distance, the user may swipe to the visual indication and return to an end of the portion of text that the user would like to select. In some examples, the user may select text that is displayed across multiple lines of text. To select such text on multiple lines the user may horizontally swipe the predetermined distance before changing the direction of the swipe gesture to a direction crossing lines of text to select a contiguous portion of text that spans multiple lines.

A mode of text selection may depend on how many fingers the user simultaneously places in contact with the touchscreen during a swipe gesture. For example, swiping with two fingers may cause selection of text on a word-by-word basis, while swiping with three fingers may cause selection of text on a sentence-by-sentence basis. A user may be able to change a mode of text selection during a swipe gesture, for example, by adding or removing fingers to the display. A determination that multiple fingers are in adjacent contact with each other may be required in order to invoke the corresponding text selection mode.

Text may be selected after a user removes his fingers from the touchscreen. An indication of the selected text is displayed, for example, by highlighting the selected text or displaying the selected text in a pop-up box. After selecting text, the user may perform an action using the selected text. Example actions include copying selected text so that it can be pasted, cutting selected text so that it can be pasted, deleting selected text, changing the color of selected text, changing the font size of selected text, changing the font type of selected text, changing a shading behind the selected text, and adding or removing emphasis to the selected text.

The action that is performed using the selected text may be based on user interaction with the selected text (e.g., user contact with a region of the touchscreen that displays the selected text). For example, a single-finger tap over the displayed text may perform a first action, while a double-finger tap (tapping simultaneously, or approximately simultaneously, with two fingers touching each other) may perform a second action. A swipe across the displayed text may perform a third action, while a long press with a single finger may perform a fourth action.

Various additional or supplementary gestures for selecting text are described in this document. For example, this document hereinafter describes multiple different mechanisms for selecting text that is displayed by a computing device, and interacting with text that has been selected by a user of the computing device.

Text Selected Mode

A computing device may be programmed to enter a text selected mode after the device determines that a user performed a text selection gesture. Once the device is in the text selected mode, user interaction with the device may be different than when the device is not in the text selected mode. For example, while the device is not in the text selected mode, a user may be able to drag the display with a one-finger swipe across the touchscreen and zoom out or in by pinching or spreading two fingers that contact the touchscreen. Once the device is in the text selected mode, the computing device may disable one or more of the dragging and zooming user input operations. In other words, once a user has selected text, the user may not be able to drag or zoom the display until the user provides user input to exit the text selected mode, for example, by tapping a portion of the touchscreen that does not show selected text.

As described in more detail below, once a user has selected text and the device is in text selected mode, the device may recognize user input gestures or operations that the device does not recognize when not in the text selected mode. For example, a user may be able to copy text by tapping a single finger on text that has been selected. When the device is not in the text selected mode, however, tapping text that is shown by the display may not copy text.

The following portion of the document describes various user input mechanisms for selecting text.

Long Press by a First Finger and a Touch by a Second Finger

Figures 1, 2:
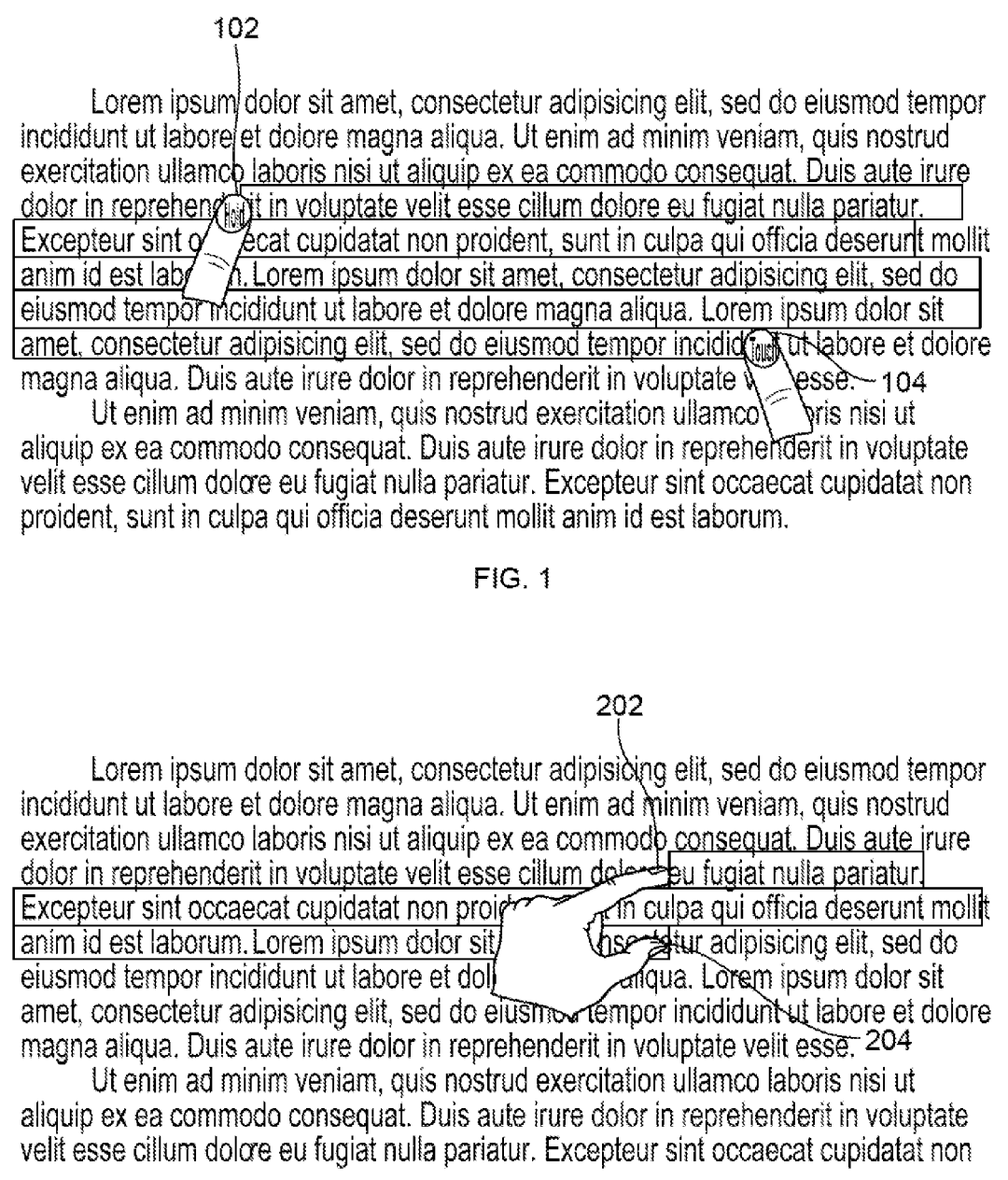

As illustrated in FIG. 1, an example text selection gesture includes a first finger 102 performing a long press on the display and a second finger 104 thereafter touching a different portion of the display. The portion of text that is between the two fingers is selected by the computing device. The portion of text may include text from multiple horizontal lines of text. In such examples, each of the lines that are between the fingers may be selected in their entirety, and the lines that were contacted by the user may be partially selected. The partial selection may include text to the right of the finger that contacted the screen at the highest position on the screen and text to the left of the finger that contacted the screen at the lowest position (when the device is oriented to read text from left to right). In other words, the selected text may include all text that a user would read starting at the finger that contacted the screen at the highest position until the user reached the text that the user contacted with the finger in the lowest position.

In this example, the "hold" may be determined as a first physical contact with the screen in a position that is determined to be substantially fixed (e.g., moving less than a predetermined distance) for a predetermined amount time. The determination may include the contact being determined to be an only physical contact with the display. The touch may be a second contact with the screen that occurs after the determined amount of time and while the first contact remains substantially fixed. To invoke the text selected mode, both contacts may remain in substantially fixed positions for a predetermined amount of time after the second contact. In some examples, the second contact must occur both after a predetermined amount of time following the first contact and before another predetermined amount of time following the first contact. If the first contact with the screen persists for too long, a cursor may appear for display at the location of the first contact. The cursor may not enable text selection or may enable text selection using a different gesture.

Text may be displayed as selected (e.g., the text may be highlighted or shown in a different color than non-selected text) after the second contact with the display. Once the text is displayed as selected, the user may change a region of selected text by moving one or both of the contacts with the screen. As an example, the user may spread his fingers farther apart to select more text or closer together to select less text. In some examples, the long press may designate a start to the selected portion of text or an end to the selected portion of text. In some examples, if the user does not complete the text selection gesture (e.g., the user does not perform the "touch") within a predetermined amount of time, the text selection gesture is not completed and text is not selected.

Press by Two Separated Fingers

As illustrated in FIG. 2, an example text selection gesture includes two fingers 202 and 204 contacting different locations in a body of text at substantially the same time (e.g., within a predetermined time of each other). As described above with respect to the "long press by a first finger and a touch by a second finger" gesture, the user may adjust one or more of his fingers to change a region of the selected text. The device may cancel a text selection operation, after a two-finger text selection gesture has been invoked, if the device determines that the user has moved his fingers together until the fingers touch and then removed his fingers from the display at substantially the same time.

Two Adjacent Finger Swipe Gesture

As illustrated in FIG. 3, an example text selection gesture includes two fingers 302 and 304 that are adjacent swiping across a line of text to select the text. As discussed in more detail later, fingers may be determined by the computing device to be adjacent, for example, if a center of a region of contact for a first finger 302 is within a predetermined distance of a center of a region of contact for a second finger 304. In some examples, the computing device requires that the fingers 302 and 304 contact the display within a predetermined time of each other in order to invoke the gesture.

As described in greater detail below, the user may swipe his fingers a predetermined distance before the text selection gesture is activated. Further, the user may follow a horizontal line of text for a predetermined distance before the user can move his fingers vertically to select additional lines of text. The text may be selected upon the user releasing his fingers from the display. In some examples, both fingers may release from contact with the display (e.g., interrupt their contact with the display) within a predetermined time of each other in order to select text.

One Finger Swipe Gesture

Figure 4:
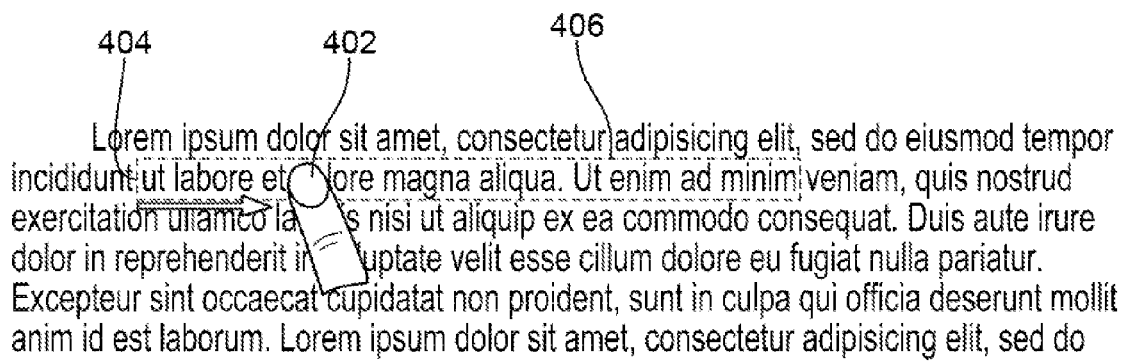
FIG. 4 illustrates a technique for selecting text with a single-touch swipe gesture.

As illustrated in FIG. 4, an example text selection gesture includes one finger 402 swiping across a line of text to select the text. The portion of text that is selected may be the portion between the location of the start of the contact 404 and the location of the end of the contact. As described below in greater detail, a user may swipe for a predetermined distance before the text selection gesture is activated. In some examples, this distance is illustrated on the touchscreen by the computing device. For example, in FIG. 4, the user contacted the display of text at the starting location 404 and thereafter the computing device displayed the box 406 on the display.

The device may not enter the text selected mode if the user does not swipe through the end of the box within a determined amount of time. As described above with reference to the "swipe by two adjacent fingers" gesture, once the user has swiped the predetermined distance through the right-most end of the box 406, the user may move his finger up or down in a vertical direction to select portions of additional lines of text. The one finger swipe gesture may not be recognized if the device determines that another object is contacting the touchscreen display at the same time as the finger 402.

In some examples, a one-finger swipe gesture is available only for portions of a display that cannot pan (e.g., an address bar of a web browser where the content display area of the web browser that displays web page content may pan). As described in greater detail below, in some examples, a user may not begin a text selection gesture with a one-finger swipe gesture but may release one or more fingers to finish with a one-finger swipe gesture. Such a change in the gesture can change a type of text selection (e.g., whether the device selects text by character or whole word).

Three Fingers Swipe Gesture

Figure 5:
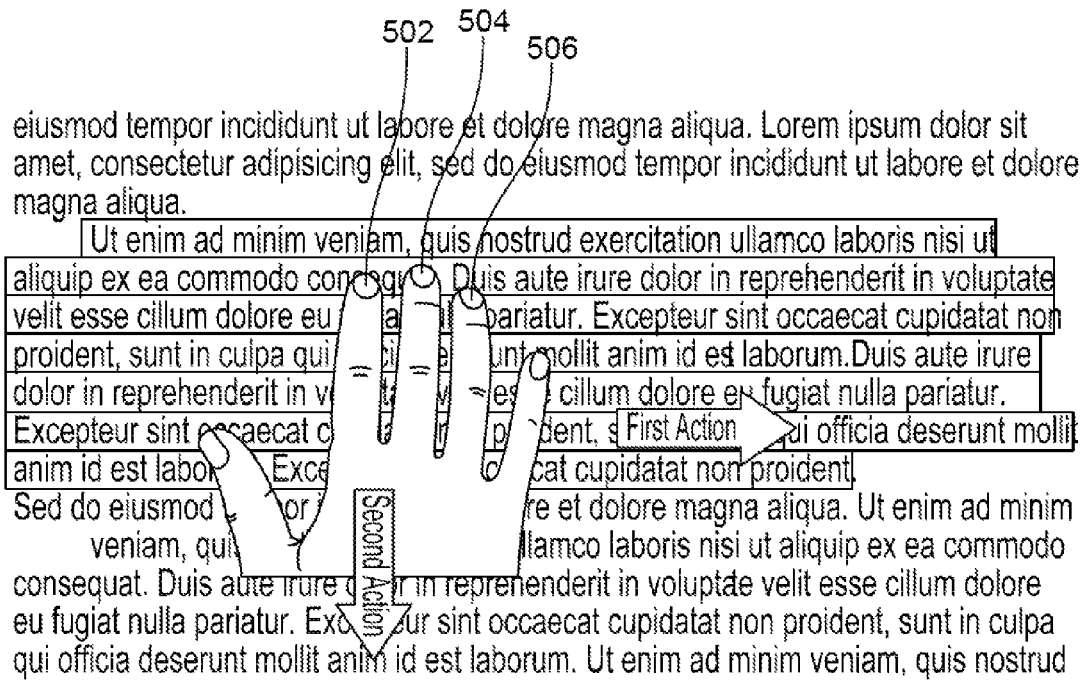
FIG. 5 illustrates a technique for selecting text with a compound multi-touch swipe gesture.

As illustrated in FIG. 5, an example text selection gesture includes swiping three or more fingers 502, 504, and 506 horizontally and simultaneously with text to perform a first action. In some examples, the first action includes selecting all text in the display, or all text in a document that is at least partially displayed. Another example text selection gesture includes swiping three or more fingers vertically to perform a second action. In some examples, the second action includes selecting the one or more paragraphs that are contacted by the three or more fingers during the vertical swipe. In some examples, the device determines that the fingers are adjacent in order to recognize the gesture. In some examples, the device does not determine that the fingers are adjacent in order to recognize the gesture.

Adjusting Selected Text Range

Figure 6:
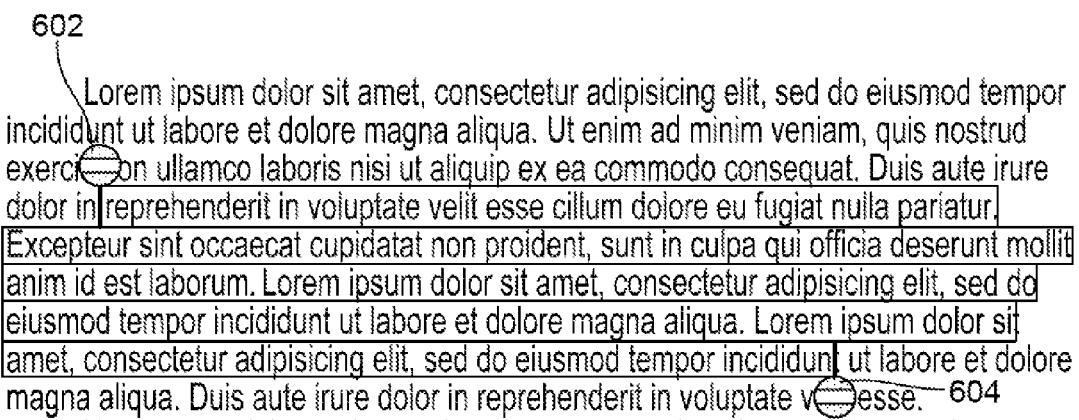
FIG. 6 illustrates a technique for adjusting a selected text range.

As illustrated in FIG. 6, the computing device may display pin 602 at a starting location of selected text and pin 604 at an ending location of the selected text. The pins 602 and 604 may appear after the user releases his fingers from the display. A user may touch a pin with a finger and move the finger, while maintaining contact with the display, in order to adjust the range of selected text. In some examples, a user may exit the selected text mode by tapping or otherwise contacting the display at a location that does not display a pin or selected text.

Figure 7:
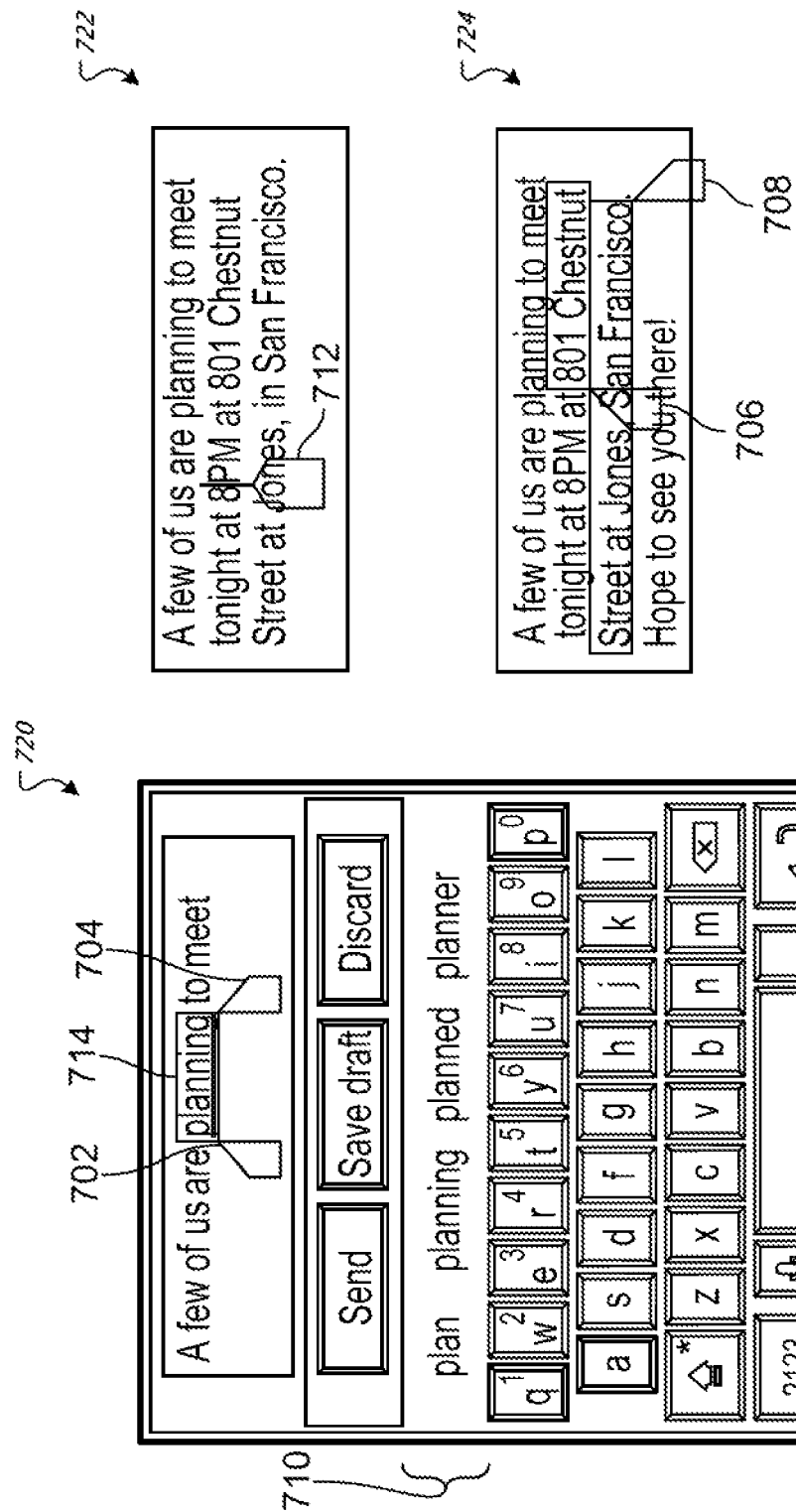
FIG. 7 illustrates an example display of selected text.

FIG. 7 illustrates another example display of selected text 714 and pins 702, 704, 706, and 708 that appear after the text has been selected. This figure shows a display 720 of a text editor application program that a mobile device is displaying on a touchscreen. A user has selected the text 714, for example, using the techniques described throughout this document. In response to selection of the text 714, the computing device displays suggested alternative words for the selected text 714 in the text suggestion area 710.

In some examples, a user may touch a single finger to the touchscreen display for a predetermined period of time in order to place a pin 712 that designates a cursor location of the user's finger (as shown in display 722). Upon release of the user's finger, the computing device may display a menu (not shown) that includes any combination of multiple options: (i) select word, (ii) select all, (iii) paste, (iv) cut, and (v) delete. In this illustration, the user selected the menu option "select word." In response, the computing system selected the word "8PM." The selected word was bounded by pins that the user could drag to resize and move the location of the selected text. In this example, the user dragged the pins 706 and 708 from their original positions bounding the word "8PM" to the locations that are shown in display 724.

Actions in Text Selected Mode

As also described below, once the computing device is in the text selected mode, in response to the device determining that the user performed a text selection gesture, the user may provide user input to perform various actions. For example, the user may contact an area of the display that does not display selected text in order to exit the text selected mode. A user may contact the selected text with a single finger to launch a default action (e.g., copying the text). A user may contact the selected text with two adjacent fingers to launch a secondary action (e.g., performing an internet search with the selected text). A user may contact the selected text with three adjacent fingers to launch a tertiary action (e.g., generating a pop-up menu of actions that can be performed using the text).

Figure 8A:
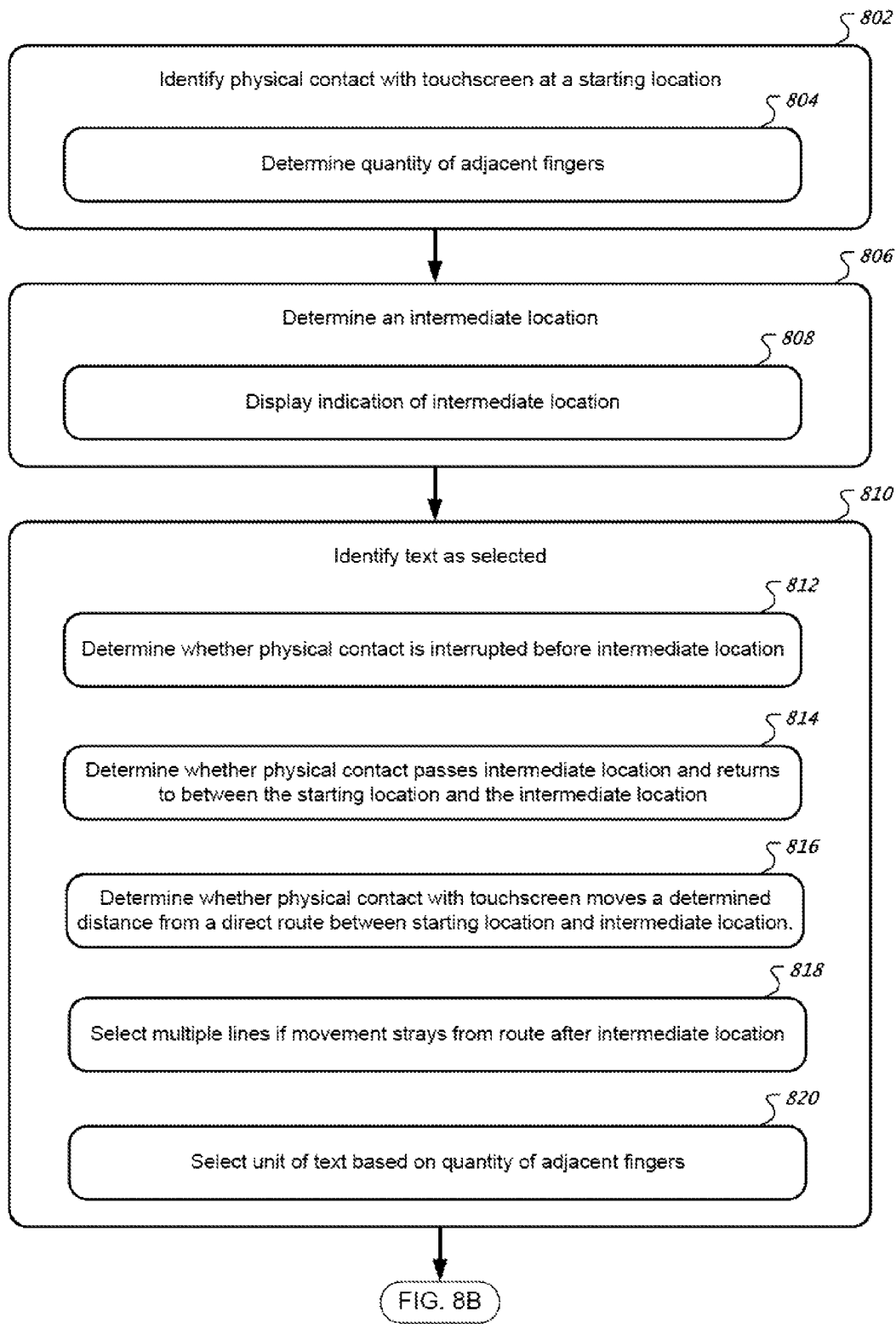
FIGS. 8A-8B show a flowchart of an example process for selecting text.
Figure 8B:
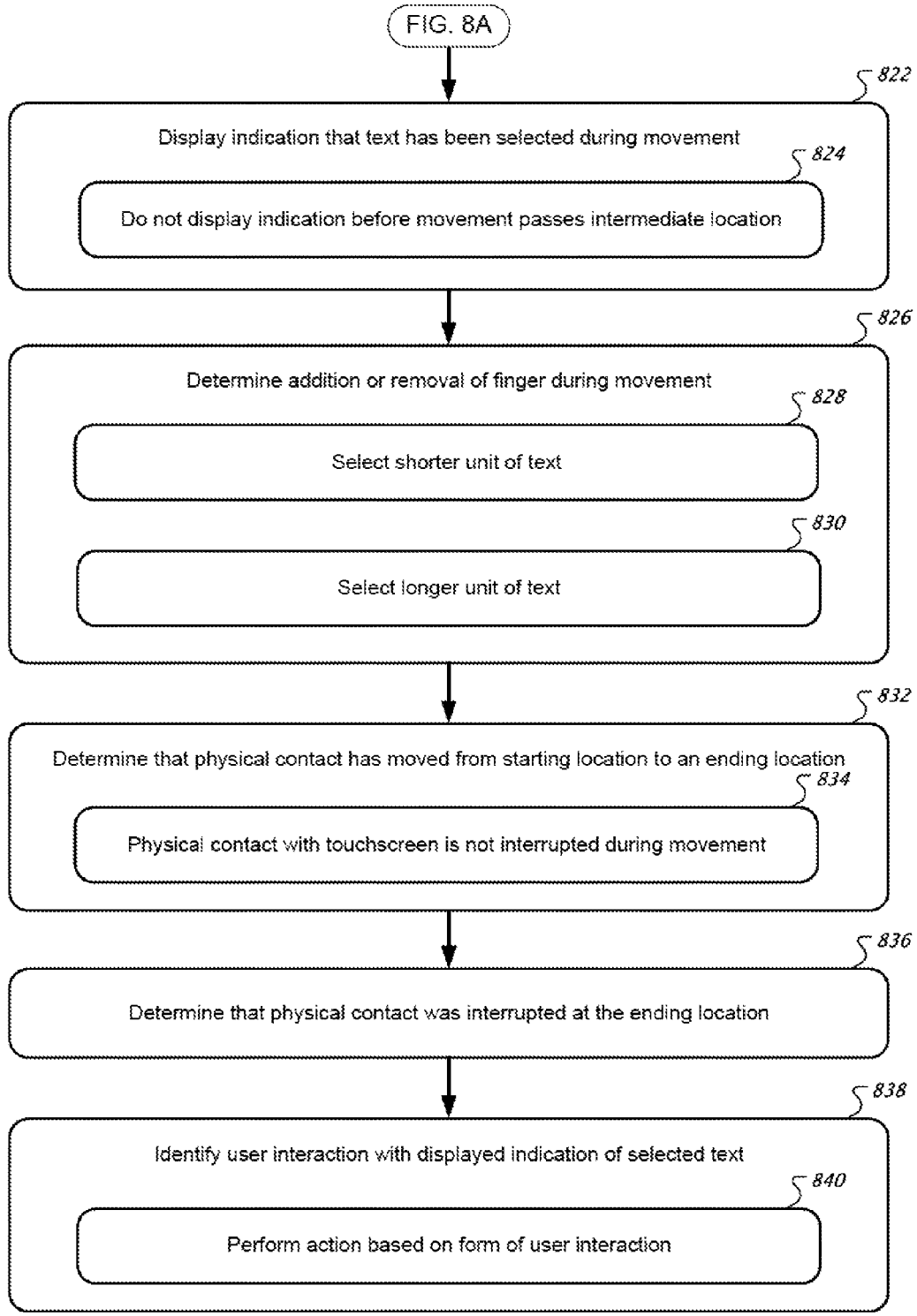

FIGS. 8A and 8B show a flowchart of an example process for selecting text. Generally, the described process is performed in response to a user swiping one or more fingers across text that is displayed by a touchscreen display device of a computing device.

In box 802, the computing device identifies physical contact with the touchscreen of the computing device at a starting location. For example, a user of a mobile computing device may physically contact one or more fingers to a touchscreen of the computing device (e.g., the user may physically contact one or more fingers to a glass surface of the touchscreen or a film cover over the glass surface). The computing device may determine a location of the contact on the touchscreen and a region of the touchscreen that is contacted (e.g., an irregularly-shaped circular region that corresponds to the contact area of the user's finger). The computing device may determine whether the contact represents contact by a finger. Further, the computing device may determine a starting location of the contact. The starting location may be determined as a location within the region of contact. In examples in which the region of contact includes a single finger, the starting location may be a center of the region of contact of the single finger. In examples in which the region of contact includes multiple fingers, the starting location may be a center of a region of contact of a leading finger, where a leading finger is a finger that leads a swiping gesture and is followed by one or more following fingers. In other examples in which the region of contact includes multiple fingers, the starting location may be a center of the region of contact of the multiple fingers, for example, a location that represents a center of a region that bounds the regions of contact of the multiple fingers.

The physical contact may be an initial physical contact as part of a gesture for selecting text. In other words, the gesture to select text may not require identification of physical contact prior to the physical contact with the touchscreen. In some examples, the physical contact does not require holding the physical contact at a substantially fixed location for more than a predetermined amount of time. In some examples, the physical contact may be an initial physical contact with the touchscreen after the text that is to be selected is displayed.

In box 804, the computing device determines a quantity of adjacent fingers that are included in the physical contact. For example, the computing device may identify whether multiple regions of contact correspond to multiple different fingers and whether a single region of contact corresponds to multiple fingers (e.g., two fingers that appear to the computing device to physically contact each other at a surface of the touchscreen). The computing device may determine that the physical contact comprises adjacent fingers, for example, by determining whether edges of the regions of contact, or designated locations for the regions of contact, are within a predetermined distance of each other.

Where the contact includes multiple adjacent fingers, the computing device may identify a starting location that corresponds to: (i) a location of the leading finger of the two fingers, (ii) a location of the trailing finger of the two fingers, or (iii) a location that is determined to be substantially at a center of the regions of the touchscreen that are contacted by the two fingers. This document's reference to "adjacent fingers" signifies fingers that are identified by the computing device as being adjacent, regardless whether the fingers physically contact each other.

In box 806, the computing device may determine an intermediate location. The intermediate location may be a location to which the computing device determines that the user must swipe the user's one or more fingers in order to invoke computing device selection of text. For example, the computing device may determine the intermediate location as a location that is a predetermined distance or quantity of textual characters to the right of the starting location (e.g., 25% of the touchscreen width). As such, the predetermined distance may not correspond to all locations that are the predetermined distance from the staring location (e.g., points of a circle that surrounds the starting location). In some examples, the computing device determines the intermediate location in response to determining that the user has begun to swipe the one or more fingers along a line of text.

In box 808, the computing device may display an indication of the intermediate location. As an illustration, in FIG. 4, the computing device displays the box 406 in response to the user touching the user's finger 406 to the touchscreen and swiping the finger 406 across the touchscreen along a row of text. The right-most edge of the box 406 may indicate the intermediate location. Thus, the computing device recognizes that text has been selected after the user swipes the finger 402 to or past the end of the box 406 (e.g., when a location that is determined to represent a location of the finger 402 reaches or passes the right-most edge of the box 406).

The indication of the intermediate location may take various forms. For example, instead of the computing device displaying the box 406, the computing device may manipulate a display of text within the box 406. The display of text may be manipulated by changing a color of the text, changing a shape of the text, or highlighting the text. In some examples, the computing device displays a graphical interface element at the intermediate location (e.g., a pin).

The computing device may not display the indication of the intermediate location before the user contacts the touchscreen at the starting location 404. For example, the computing device may display the indication of the intermediate location after the user has contacted the display device for a determined amount of time or after the user has swiped his one or more fingers a determined distance. As an illustration, the indication of the intermediate location may appear at a location 5 cm to the right of the starting location after the user has swiped his finger 1 cm from the starting location.

In some examples, the indication of the intermediate location may not appear if the user does not swipe the finger 402 along a line of text. For example, the computing device may determine whether the starting location 402 corresponds to a location of text, and may determine whether the path over which the finger 402 swipes corresponds to text from a single line of text.

In box 810, the computing device may identify text as selected. The identification of selected text may occur one or more times during a user's swiping or after a user has completed swiping (e.g., after the user releases his one or more fingers from the touchscreen). The computing device can use the results of the identification to determine which text to display as selected during a touchscreen swipe gesture, and to determine which text to identify as selected upon completion of the touchscreen swipe gesture.

In box 812, the computing device may determine whether physical contact with the touchscreen is interrupted before the physical contact reaches the intermediate location. If the physical contact is interrupted before the intermediate location, the computing device may not identify text as selected and may cancel the text selection mode. As an illustration and as described above, if the user removes his one or more fingers from the display before swiping through the end of the box 406, the computing device may not identify text as selected and may cancel the text selection mode. On the other hand, if the physical contact is not interrupted before the intermediate location, the computing device may identify text as selected and may invoke the text selection mode.

In box 814, the computing device may determine whether physical contact with the touchscreen passes the intermediate location and thereafter returns to between the starting location and the intermediate location. If the physical contact passes the intermediate location and returns to between the starting location and the intermediate location, the computing device may identify text between the starting location and the physical contact as selected and may invoke the text selection mode. On the other hand, if the physical contact has not reached the intermediate location, the computing device may not yet identify text as selected and may not yet invoke text selection mode. If the physical contact has passed the intermediate location, the computing device may identify text between the starting location and the physical contact as selected and may invoke the text selection mode.

The computing device may perform the operations of box 814 in examples where the computing device does not identify text as selected until physical contact swipes past the intermediate location. In such examples and as described above, in order to select a portion of text that is shorter than the distance from the starting location to the intermediate location, the user may first swipe to the intermediate location and then may return to the desired ending location.

In box 816, the computing device may determine whether physical contact with the touchscreen moves a determined distance from a direct route between the starting location and the intermediate location. If the physical contact moves the determined distance from the direct route, the computing device may not identify text as selected and may cancel the test selection mode. On the other hand, if the physical contact does not move the determined distance from the direct route and passes the intermediate location, the computing device may identify text as selected and may invoke the text selection mode. For example, the computing device may terminate its recognition of a text selection gesture if a user swipes away from a horizontal line of text. In some examples, the computing device may terminate its recognition of a text selection gesture if the device detects that a user begins to swipe along a horizontal line of text but then moves the swipe a determined distance vertically. The determined distance may be a tangential distance from the line of text.

In box 818, the computing device may select at least portions of multiple lines of text if the physical contact strays, after the physical contact reaches the intermediate location, a predetermined distance from a horizontal line of text that includes the direct route between the starting location and the intermediate location. As an illustration of some scenarios, a user may not select multiple lines of text by swiping vertically from a starting location. Instead, the user may select multiple lines of text by swiping horizontally from the starting location with text and past a visual indication of an intermediate location. Once the user swipes past the intermediate location, the user may move his finger up or down to select other lines of text.

The text that is selected may include a continuous block of readable text between the starting location and the ending location. In other words, if the user swipes upward, the text that is selected may include a portion of the line to the right of the ending location, any intermediate lines between the ending location and the starting location, and the portion of the line to the left of the starting location (in languages that are read from left to right). If the user swipes downward, the text that is selected may include a portion of the line to the right of the starting location, any intermediate lines between the starting location and the ending location, and the portion of the line to the left of the ending location.

In box 820, the computing device selects text by a unit of text based on a quantity of adjacent fingers that are included in the physical contact. For example, when text is identified as selected (e.g., during the swipe gesture or upon completion of the swipe gesture), the computing device may determine a quantity of adjacent fingers that the physical contact includes (box 804). The computing device may select text in increments of whole words if a first quantity of one or more adjacent fingers was simultaneously used in the swipe gesture. Similarly, the computing device may select text in increments of individual characters if a second quantity of one or more adjacent fingers was used, select text in increments of whole sentences if a third quantity of one or more adjacent fingers was used, and select text in increments of whole paragraphs if a fourth quantity of adjacent fingers was used.

Selecting text by whole word may include the computing device not selecting a part of a word (e.g., a subset of a contiguous block of characters that are not separated by any spaces) if the ending or starting location of the swiping user input is located within the word. Instead, the computing device may include the entire word as selected if the user starts or ends the swipe gesture within a word. The computing device may also use the beginning of the word as the starting or ending location, for example, based on the user contacting his finger to or releasing his finger from the display at a portion of the word that is closer to the beginning of the word than the end of the word.

In some examples, selecting text by individual characters may permit selection of partial words. Selecting text by sentence may not permit selecting a portion of a sentence (e.g., where a sentence may include multiple words that are not determined to be separated with a ".", "?", or "!" sentence-ending punctuation mark). Selecting text by paragraph may not permit selecting a portion of a paragraph.

As a first illustration, a user may swipe across a line of text using two fingers. The computing device may highlight selected words by surrounding the selected words in yellow shading as the user passes over the words. The computing device, however, may not highlight a subset of the characters in a word. Instead, each word may be highlighted with a block of yellow shading at the same time (as perceived by a user) as the user passes over the word.

As a second illustration, a computing device may not highlight text as a user swipes over the text with two adjacent fingers, however, upon the user releasing his two fingers from the touchscreen, the computing device may display a pop up box that shows the text that the user swiped over, without displaying any partial words. In this illustration, the ending location of the user's swipe may have been within a word. Based on the user swiping with a quantity of adjacent fingers that corresponds to "word" selection, the computing device may select the entire word that corresponds to the ending location. If the user had swiped with a single finger, the pop up box may include a portion of the word.

The computing device may determine the characters, words, or sentences that are selected based on the starting and ending locations. For example, the starting location may represent a pixel on the touchscreen display. The pixel, however, may not lie between two characters. As such, the computing device, if in character selection mode, may select text beginning with a location between two characters that is closest to the starting location.

In box 822, the computing device displays an indication that text has been selected during movement of physical contact with the touchscreen. For example, and as described throughout this document, the computing device may display the text that a user has swiped over as highlighted, a different color, emphasized, or otherwise in a manner that distinguishes the text from text that has not been selected.

In box 824, the computing device does not display the indication that text has been selected until the movement of the physical contact passes the intermediate location. As an illustration with reference to FIG. 4, the text between the starting location 404 and the user's finger 402 may not appear as highlighted or different than other text in the text block until the user's finger 402 reaches or passes the right-most edge of the box 406.

In box 826, the computing device may determine whether the physical contact with the touchscreen includes the addition or removal of a finger during movement of the physical contact. In response to such a determined change in a quantity of fingers contacting the touchscreen, the computing device may change a mode for selecting text. For example, a single finger may correspond to "character" selection mode, two adjacent fingers may correspond to "word" selection mode, and three adjacent fingers may correspond to "sentence" selection mode.

As described above with reference to box 820, a user may select text in a particular mode by starting a swipe gesture with a certain quantity of fingers. In some examples, however, the user may change the text selection mode during a swipe. For example, the computing device may select text based on a shorter unit of text (box 828) if the user removes a finger during the movement, and may select text based on a longer unit of text (box 830) if the user adds a finger during the movement. Example units of text, in order from short to long, include character, word, sentence, and paragraph.

As an illustration, a user may begin a selection of text by swiping simultaneously with two fingers. As the user swipes across a line of text, the text may highlight one word at a time. The user, however, may decide that he would like to select only a portion of the last word in the selection. As such, the user may lift one of his two fingers off of the display. The computing device may identify that a single finger remains in contact with the display, and may begin highlighting words one character at a time as the user swipes across the display.

If instead, the user decided that he would prefer to highlight a portion of text one sentence at a time, the user may add a third finger to the swipe gesture. The computing device may identify the addition of the third finger and may begin to highlight text sentence-by-sentence instead of word-by-word. In some examples, at least one finger must remain in contact with the display during the addition or removal of a finger. If not, the text selection may end at the location of the interruption of the physical contact with the display.

In box 832, the computing device may determine that the physical contact moved from the starting location to an ending location. For example, the computing device may track the movement of the physical contact across the touchscreen. As the physical contact moves, the computing device may repeatedly identify text that has been selected (box 810) and display an indication of text that has been selected (box 822).

In box 834, determining that the physical contact moves from the starting location to the ending location may include determining that physical contact with the touchscreen is not interrupted during the movement. Determining that the physical contact is not interrupted includes not identifying that physical contact with the touchscreen has ended (e.g., where contact ending includes a user lifting the user's one or more fingers off of the touchscreen so that the user does not contact touchscreen).

In some examples, determining that physical contact with the touchscreen is not interrupted includes determining that physical contact with the touchscreen has not ended for more than a determined amount of time. For example, the user may be swiping across the touchscreen when the user temporarily lifts his finger from the touchscreen. The computing system may determine that the lift is inadvertent based on the lift from the touchscreen lasting for less than a threshold amount of time. For example, a momentary bounce of the user's finger off of the touchscreen may not cause interruption in the swipe gesture because the finger does not end contact the touchscreen for less than 0.1 seconds.

In box 836, the computing device may determine that the physical contact was interrupted at the ending location. For example, the computing device may identify that physical contact sufficient to continue a user swiping motion has ceased. The swiping motion may cease by the user interrupting physical contact with the touchscreen. The swiping motion may also cease if the computing device determines that the physical contact has changed to a form that is not recognized by the computing device, for example, if the two fingers of a swipe gesture spread apart until the computing device does not identify the two fingers as being adjacent.

Upon the computing device determining that the physical contact was interrupted, the computing device may: (i) continue to display a visual indication that the selected text was selected; (ii) display a visual indication that the selected text is selected where no visual indication was previously displayed during the physical contact, or (iii) display a different visual indication that the selected text was selected than a visual indication that was previously displayed during the user's swipe gesture.

In box 838, the computing device identifies user interaction with the displayed indication of selected text. For example, the user may contact at least part of the touchscreen over a region where the touchscreen is displaying the selected text. The computing device may recognize various user input mechanisms that permit the user to interact with the selected text. A first mechanism includes determining that the user contacted one or more fingers to the selected text and removed the one or more fingers from the selected text within a predetermined amount of time. In other words, the user "tapped" the selected text with one or more fingers. If the user tapped with more than one finger, the computing device may require that the more than one finger be determined to be adjacent. Tapping with adjacent fingers may invoke a different action than tapping a same quantity of non-adjacent fingers. Tapping a first number of one or more fingers may invoke a different action than tapping a second number of one or more fingers.

A second input mechanism includes determining that a user contacted a one or more fingers to the selected text and maintained contact for beyond a determined amount of time. In other words, the user performed a "long press" or a "hold" with one or more fingers. If the user performed the long press with more than one finger, the computing device may require that the more than one finger be determined to be adjacent. Long pressing with adjacent fingers may perform a different action than long pressing by a same number of non-adjacent fingers. A third input mechanism includes swiping one or more fingers either along or across the selected text.

In box 840, the computing device performs an action that corresponds to the user interaction with the text. Example actions include: (i) copying the selected text, (ii) cutting the selected text, (iii) deleting the selected text, (iv) changing a font type of the selected text, (v) changing a font color of the selected text, (vi) adding or removing emphasis from the selected text, and (v) invoking a search of a search engine using the selected text as a search query, without additional user interaction with the selected text.

Any combination of the actions described throughout this document may be assigned to any combination of the input mechanisms described throughout this document. As an illustration, computing device may be configured so that user tapping of selected text with a single finger copies the text while user long press of the selected text invokes display of a menu with multiple selectable options for performing multiple respective actions. Tapping with two adjacent fingers may invoke a search using the selected text as a query. In some examples, the text is copied automatically upon the swiping gesture.

In some examples, a computing device may recognize physical contact that is not performed by fingers. For example, a computing device may recognize user interaction by a stylus. In other examples, a computing device may recognize when a user swipes two gloved fingers across the display, where each of the gloved fingers includes a protrusion for contacting the touchscreen. In this example, although the locations of contact may be separated by a greater distance than when a user swipes with two adjacent bare fingers, the computing device may be programmed to recognize the swiping instruments, and may accordingly adjust parameters for the gestures to be specific to the instruments. Discussion in this document to user interaction with fingers may also apply to user interaction using one or more other objects.

In some examples, the gestures that are described in this document may be used to select non-text items. For example, a user interface may display a grid of pictures. A user may select pictures by performing a two adjacent finger swipe gesture across a subset of the pictures. The user may select a row of pictures by performing a three adjacent finger swipe gesture across a portion of the row of pictures.

In some examples, the computing device is remote from the display device. For example the computing device may receive indications of user interactions, with the display device, over network (e.g., the Internet).

Operations that are described with respect to the flowchart of FIGS. 8A and 8B may not be performed in the order illustrated in FIGS. 8A and 8B. Further, at least some of the operations that are described with respect to the flowchart may be optional. For example, the identification that text has been selected (box 810) may not be performed until after the computing device determines that the physical contact was interrupted (box 836). As another example, the computing device may repeatedly during the movement: (i) determine whether a user has added or removed a finger (box 826); (ii) display an indication that text has been selected (box 822); (iii) identify what text has been selected (box 810); or (iv) any combination of (i)-(iii). As such, the above description of FIGS. 8A and 8B may describe multiple different gestures and the corresponding operations that may be implemented by a computing device to permit text selection.

Figure 9:
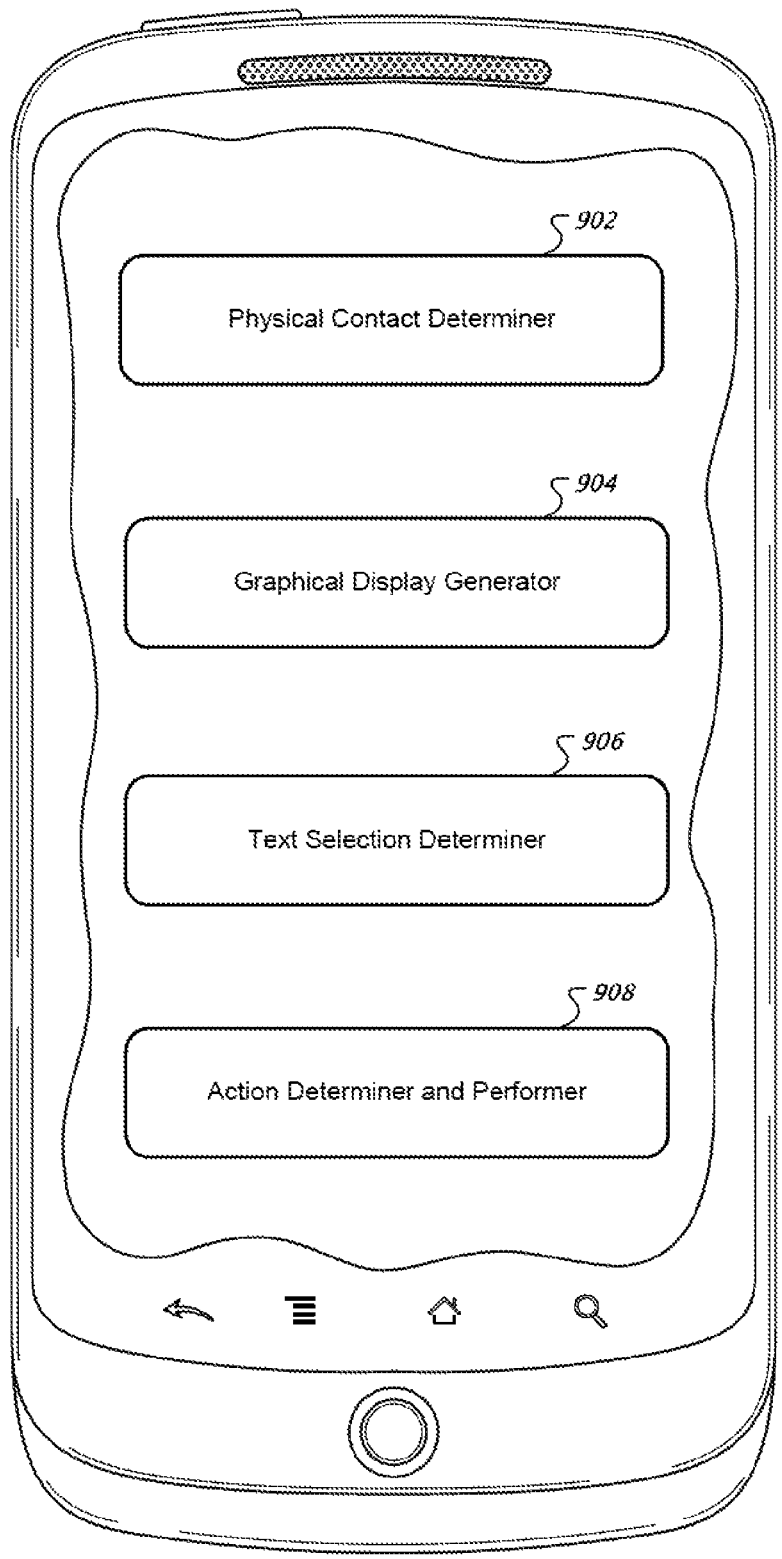
FIG. 9 is a conceptual diagram of a system for selecting text.

FIG. 9 is a conceptual diagram of a system for selecting text. The system of FIG. 9 may perform the operations that are described with reference to the flowchart of FIGS. 8A and 8B. For example, the physical contact determiner 902 may determine whether one or more physical objects contact the touchscreen. The physical contact determiner 902 may determine a location of physical contact of the one or more physical objects. The physical contact determiner 902 may determine whether the one or more physical objects move across the touchscreen. The physical contact determiner 902 may determine a representative location of each of the one or more physical objects (e.g., a weighted "center" of each of one or more fingers).

The physical contact determiner 902 may determine whether the one or more physical objects represent adjacent fingers (e.g., by determining whether the weighted center of two fingers are within a predetermined distance of each other, and determining whether the weighted center of each of three fingers is no further than a predetermined distance from a nearest finger). The physical contact determiner 902 may perform some or all of the operations of boxes 802, 804, and 836, among other operations that are described with reference to the flowchart of FIGS. 8A and 8B and elsewhere in this disclosure.

The graphical display generator 904 may display, for example, by causing a touchscreen display device to display, text (e.g., English alphanumeric characters that are arranged in rows). The graphical display generator 904 may receive an indication of text that has been selected, and can display a visual indication of that the text has been selected. The graphical display generator 904 can display a visual indication of an intermediate location. The graphical display generator 904 can generate a display of pop-up box that includes the selected text. The graphical display generator 904 may perform some or all of the operations of boxes 808, 822, and 824, among other operations that are described with reference to the flowchart of FIGS. 8A and 8B and elsewhere in this disclosure.

The text selection determiner 906 may determine an intermediate location and request display of an indication of the intermediate location. The text selection determiner 906 may identify text that has been selected, for example, as described throughout this document. The text selection determiner 906 may request display of an indication that text has been selected. The text selection determiner 906 may determine which unit of text should be selected. The text selection determiner 906 may determine whether physical contact is sufficient to cause selection of text. The text selection determiner 906 may perform some or all of the operations of boxes 806, 810, 812, 814, 816, 818, 818, 820, 826, 828, 830, 832, and 834, among other operations that are described with reference to the flowchart of FIGS. 8A and 8B and elsewhere in this disclosure.

The action determiner and performer 908 may determine whether the user interaction with the touchscreen invokes an action that is associated with text that has been selected. If so, the action determiner and performer 908 may perform the action. The action determiner and performer 908 may perform some or all of the operations of boxes 838 and 840, among other operations that are described with reference to the flowchart of FIGS. 8A and 8B and elsewhere in this disclosure.

Figure 10:
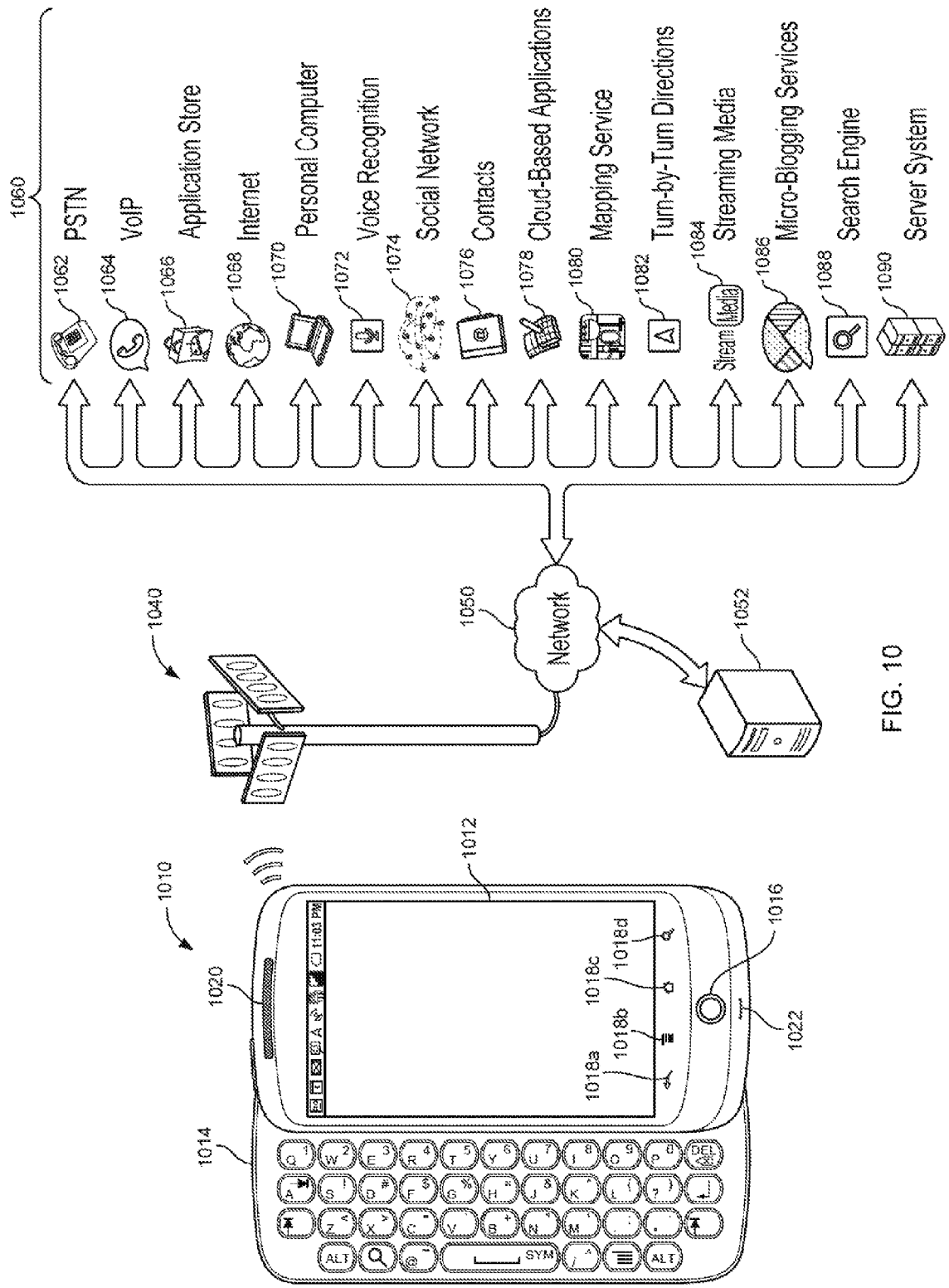
FIG. 10 is a conceptual diagram of a system

Referring now to FIG. 10, a conceptual diagram of a system that may be used to implement the systems and methods described in this document is illustrated. In the system, mobile computing device 1010 can wirelessly communicate with base station 1040, which can provide the mobile computing device wireless access to numerous hosted services 1060 through a network 1050.

In this illustration, the mobile computing device 1010 is depicted as a handheld mobile telephone (e.g., a smartphone, or application telephone) that includes a touchscreen display device 1012 for presenting content to a user of the mobile computing device 1010 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 1014, physical buttons, trackballs, accelerometers, gyroscopes, and magnetometers).

Example visual output mechanism in the form of display device 1012 may take the form of a 3.7 or 4.3 inch LED or AMOLED display with resistive or capacitive touch capabilities, for displaying video, graphics, images, and text, and coordinating user touch input locations with the location of displayed information so that user contact at a location of a displayed item may be associated with the item by the device 1010. The mobile computing device 1010 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 1014, which may be a full qwerty keyboard or a traditional keypad that includes keys for the digits '0-9', '*', and '#.' The keyboard 1014 receives input when a user physically contacts or depresses a keyboard key. User manipulation of a trackball 1016 or interaction with a track pad enables the user to supply directional and rate of rotation information to the mobile computing device 1010 (e.g., to manipulate a position of a cursor on the display device 1012).

The mobile computing device 1010 may be able to determine a position of physical contact with the touchscreen display device 1012 (e.g., a position of contact by a finger or a stylus). Using the touchscreen 1012, various "virtual" input mechanisms may be produced, where a user interacts with a graphical user interface element depicted on the touchscreen 1012 by contacting the graphical user interface element. An example of a "virtual" input mechanism is a "software keyboard," where a keyboard is displayed on the touchscreen and a user selects keys by pressing a region of the touchscreen 1012 that corresponds to each key.

The mobile computing device 1010 may include mechanical or touch sensitive buttons 1018a-d. Additionally, the mobile computing device may include buttons for adjusting volume output by the one or more speakers 1020, and a button for turning the mobile computing device on or off. A microphone 1022 allows the mobile computing device 1010 to convert audible sounds into an electrical signal that may be digitally encoded and stored in computer-readable memory, or transmitted to another computing device. The mobile computing device 1010 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 1010 may present a graphical user interface with the touchscreen 1012. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 1004. User-selection of the button may invoke the pre-defined action.

In some examples, the operating system provides a "desktop" user interface that is displayed upon turning on the mobile computing device 1010, activating the mobile computing device 1010 from a sleep state, upon "unlocking" the mobile computing device 1010, or upon receiving user-selection of the "home" button 1018c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 1010 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 1012 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 1010 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 1010 may include other application modules and hardware. A call handling unit may receive an indication of an incoming telephone call and provide a user the capability to answer the incoming telephone call. A media player may allow a user to listen to music or play movies that are stored in local memory of the mobile computing device 1010. The mobile telephone 1010 may include a digital camera sensor, and corresponding image and video capture and editing software. An internet browser may enable the user to view content from a web page by typing in an addresses corresponding to the web page or selecting a link to the web page.

The mobile computing device 1010 may include an antenna to wirelessly communicate information with the base station 1040. The base station 1040 may be one of many base stations in a collection of base stations (e.g., a mobile telephone cellular network) that enables the mobile computing device 1010 to maintain communication with a network 1050 as the mobile computing device is geographically moved. The computing device 1010 may alternatively or additionally communicate with the network 1050 through a Wi-Fi router or a wired connection (e.g., Ethernet, USB, or FIREWIRE). The computing device 1010 may also wirelessly communicate with other computing devices using BLUETOOTH protocols, or may employ an ad-hoc wireless network.

A service provider that operates the network of base stations may connect the mobile computing device 1010 to the network 1050 to enable communication between the mobile computing device 1010 and other computerized devices that provide services 1060. Although the services 1060 may be provided over different networks (e.g., the service provider's internal network, the Public Switched Telephone Network, and the Internet), network 1050 is illustrated as a single network. The service provider may operate a server system 1052 that routes information packets and voice data between the mobile computing device 1010 and computing devices associated with the services 1060.

The network 1050 may connect the mobile computing device 1010 to the Public Switched Telephone Network (PSTN) 1062 in order to establish voice or fax communication between the mobile computing device 1010 and another computing device. For example, the service provider server system 1052 may receive an indication from the PSTN 1062 of an incoming call for the mobile computing device 1010. Conversely, the mobile computing device 1010 may send a communication to the service provider server system 1052 initiating a telephone call with a telephone number that is associated with a device accessible through the PSTN 1062.

The network 1050 may connect the mobile computing device 1010 with a Voice over Internet Protocol (VoIP) service 1064 that routes voice communications over an IP network, as opposed to the PSTN. For example, a user of the mobile computing device 1010 may invoke a VoIP application and initiate a call using the program. The service provider server system 1052 may forward voice data from the call to a VoIP service, which may route the call over the internet to a corresponding computing device, potentially using the PSTN for a final leg of the connection.

An application store 1066 may provide a user of the mobile computing device 1010 the ability to browse a list of remotely stored application programs that the user may download over the network 1050 and install on the mobile computing device 1010. The application store 1066 may serve as a repository of applications developed by third-party application developers. An application program that is installed on the mobile computing device 1010 may be able to communicate over the network 1050 with server systems that are designated for the application program. For example, a VoIP application program may be downloaded from the Application Store 1066, enabling the user to communicate with the VoIP service 1064.

The mobile computing device 1010 may access content on the internet 1068 through network 1050. For example, a user of the mobile computing device 1010 may invoke a web browser application that requests data from remote computing devices that are accessible at designated universal resource locations. In various examples, some of the services 1060 are accessible over the internet.

The mobile computing device may communicate with a personal computer 1070. For example, the personal computer 1070 may be the home computer for a user of the mobile computing device 1010. Thus, the user may be able to stream media from his personal computer 1070. The user may also view the file structure of his personal computer 1070, and transmit selected documents between the computerized devices.

A voice recognition service 1072 may receive voice communication data recorded with the mobile computing device's microphone 1022, and translate the voice communication into corresponding textual data. In some examples, the translated text is provided to a search engine as a web query, and responsive search engine search results are transmitted to the mobile computing device 1010.

The mobile computing device 1010 may communicate with a social network 1074. The social network may include numerous members, some of which have agreed to be related as acquaintances. Application programs on the mobile computing device 1010 may access the social network 1074 to retrieve information based on the acquaintances of the user of the mobile computing device. For example, an "address book" application program may retrieve telephone numbers for the user's acquaintances. In various examples, content may be delivered to the mobile computing device 1010 based on social network distances from the user to other members. For example, advertisement and news article content may be selected for the user based on a level of interaction with such content by members that are "close" to the user (e.g., members that are "friends" or "friends of friends").

The mobile computing device 1010 may access a personal set of contacts 1076 through network 1050. Each contact may identify an individual and include information about that individual (e.g., a phone number, an email address, and a birthday). Because the set of contacts is hosted remotely to the mobile computing device 1010, the user may access and maintain the contacts 1076 across several devices as a common set of contacts.

The mobile computing device 1010 may access cloud-based application programs 1078. Cloud-computing provides application programs (e.g., a word processor or an email program) that are hosted remotely from the mobile computing device 1010, and may be accessed by the device 1010 using a web browser or a dedicated program. Example cloud-based application programs include GOOGLE DOCS word processor and spreadsheet service, GOOGLE GMAIL webmail service, and PICASA picture manager.

Mapping service 1080 can provide the mobile computing device 1010 with street maps, route planning information, and satellite images. An example mapping service is GOOGLE MAPS. The mapping service 1080 may also receive queries and return location-specific results. For example, the mobile computing device 1010 may send an estimated location of the mobile computing device and a user-entered query for "pizza places" to the mapping service 1080. The mapping service 1080 may return a street map with "markers" superimposed on the map that identify geographical locations of nearby "pizza places."

Turn-by-turn service 1082 may provide the mobile computing device 1010 with turn-by-turn directions to a user-supplied destination. For example, the turn-by-turn service 1082 may stream to device 1010 a street-level view of an estimated location of the device, along with data for providing audio commands and superimposing arrows that direct a user of the device 1010 to the destination.

Various forms of streaming media 1084 may be requested by the mobile computing device 1010. For example, computing device 1010 may request a stream for a pre-recorded video file, a live television program, or a live radio program. Example services that provide streaming media include YOUTUBE and PANDORA.

A micro-blogging service 1086 may receive from the mobile computing device 1010 a user-input post that does not identify recipients of the post. The micro-blogging service 1086 may disseminate the post to other members of the micro-blogging service 1086 that agreed to subscribe to the user.

A search engine 1088 may receive user-entered textual or verbal queries from the mobile computing device 1010, determine a set of internet-accessible documents that are responsive to the query, and provide to the device 1010 information to display a list of search results for the responsive documents. In examples where a verbal query is received, the voice recognition service 1072 may translate the received audio into a textual query that is sent to the search engine.

These and other services may be implemented in a server system 1090. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 11:
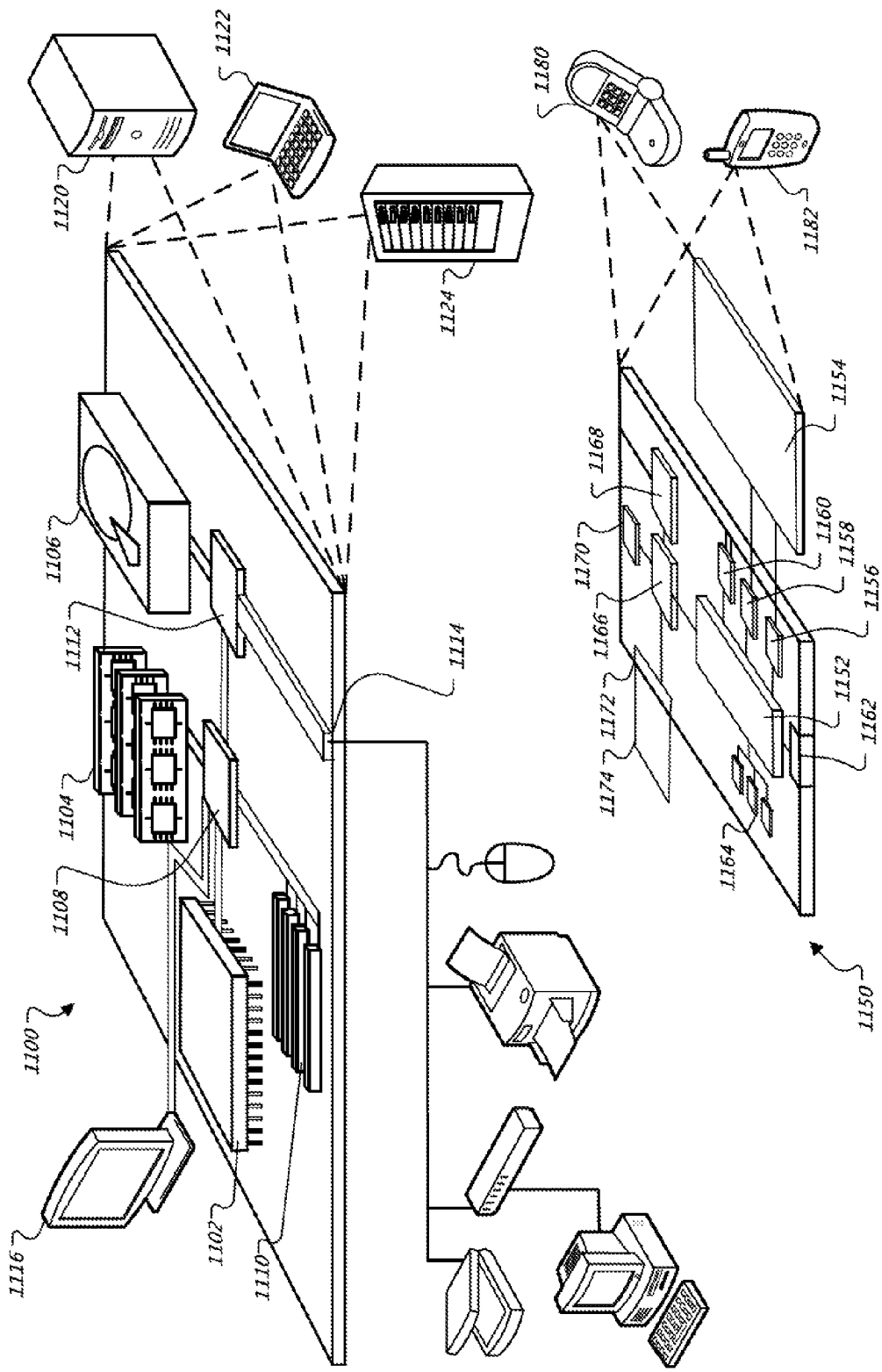
FIG. 11 is a block diagram of computing devices.

FIG. 11 is a block diagram of computing devices 1100, 1150 that may be used to implement the systems and methods described in this document, as either a client or as a server or plurality of servers. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. Additionally computing device 1100 or 1150 can include Universal Serial Bus (USB) flash drives. The USB flash drives may store operating systems and other applications. The USB flash drives can include input/output components, such as a wireless transmitter or USB connector that may be inserted into a USB port of another computing device.

The components shown here, their connections and relationships, and their functions, are meant to be exemplary only, and are not meant to limit implementations described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152 that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for selecting text, the method comprising:
   identifying, by a computing device, that user contact with a touchscreen display of the computing device includes a single finger that initiated contact with the touchscreen display in a middle of a first word that is displayed by the touchscreen display;
   determining, by the computing device, that the single finger moved across the touchscreen display from the middle of the first word to a second word that is displayed by the touchscreen display, without the single finger having released from contact with the touchscreen display, wherein the touchscreen display presents one or more words between the first word and the second word;
   responsive to the computing device identifying that the user contact with the touchscreen display includes the single finger, in distinction to multiple fingers, and while the user contact is in contact with the second word without the single finger having released from contact with the touchscreen display since contacting the middle of the first word, displaying at the touchscreen display an indication that text between the first word and the second word is selected as individual characters so that the first word is indicated as partially selected in distinction to the first word being indicated as fully selected; and responsive to the computing device determining that the user contact with the touchscreen display has switched from including the single finger to including multiple fingers due to an addition of another finger contacting the touchscreen display, and while the user contact is in contact with the second word without the single finger having released from contact with the touchscreen display since contacting the touchscreen display in the middle of the first word, switching from (i) displaying the indication that text between the first word and the second word is selected as individual characters so that the first word is indicated as partially selected in distinction to the first word being indicated as fully selected to (ii) displaying at the touchscreen display an indication that text between the first word and the second word is selected as whole words so that an entirety of the first word is indicated as selected.

2. The computer-implemented method of claim 1, wherein determining that the user contact with the touchscreen display switched from including the single finger to including the multiple fingers includes determining that the user contact with the touchscreen switched from including the single finger in contact with the touchscreen display to including the multiple fingers that are in contact with the touchscreen display and that are determined to be adjacent to each other.

3. The computer-implemented method of claim 1, wherein:
displaying the indication that text between the first word and the second word is selected as individual characters involves indicating that a portion of the second word is selected in distinction to the second word being indicated as fully selected; and
displaying the indication that text between the first word and the second word is selected as whole words involves indicating that the second word is indicated as fully selected, even though the multiple fingers contact the touchscreen display at a location that corresponds to a middle of the second word.

4. The computer-implemented method of claim 1, wherein displaying the indication that text between the first word and the second word is selected as individual characters includes: (i) changing a color of the text between the first word and the second word, (ii) changing a shape of the text between the first word and the second word, or (iii) highlighting the text between the first word and the second word.

5. The computer-implemented method of claim 1, further comprising displaying an indication that the text that is contacted by the single finger during the movement of the single finger from the first word to the second word is selected on a character-by-character basis or a word-by-word basis depending on whether the user contact with the touchscreen display includes the single finger or the multiple fingers during the movement of the user contact with the touchscreen display from the first word to the second word.

6. The computer-implemented method of claim 1, further comprising, after the user contact with the touchscreen display has released from contact with the touchscreen display at a releasing location of the touchscreen display, receiving an indication that a second user input contacted a displayed indication that the text between the first word and the releasing location of the touchscreen display was selected, and as a result, pasting over, copying, or cutting the text between the first word and the releasing location of the touchscreen display.

7. A non-transitory computer-readable storage device having instructions stored therein that, when executed by one or more programmable processors, cause the one or more programmable processors to perform operations including:

identifying, by a computing device, that user contact with a touchscreen display of the computing device includes a single finger that initiated contact with the touchscreen display in a middle of a first word that is displayed by the touchscreen display;

determining, by the computing device, that the single finger moved across the touchscreen display from the middle of the first word to a second word that is displayed by the touchscreen display, without the single finger having released from contact with the touchscreen display, wherein the touchscreen display presents one or more words between the first word and the second word;

responsive to the computing device identifying that the user contact with the touchscreen display includes the single finger, in distinction to multiple fingers, and while the user contact is in contact with the second word without the single finger having released from contact with the touchscreen display since contacting the middle of the first word, displaying at the touchscreen display an indication that text between the first word and the second word is selected as individual characters so that the first word is indicated as partially selected in distinction to the first word being indicated as fully selected; and responsive to the computing device determining that the user contact with the touchscreen display has switched from including the single finger to including multiple fingers due to an addition of another finger contacting the touchscreen display, and while the user contact is in contact with the second word without the single finger having released from contact with the touchscreen display since contacting the touchscreen display in the middle of the first word, switching from (i) displaying the indication that text between the first word and the second word is selected as individual characters so that the first word is indicated as partially selected in distinction to the first word being indicated as fully selected to (ii) displaying at the touchscreen display an indication that text between the first word and the second word is selected as whole words so that an entirety of the first word is indicated as selected.

8. The non-transitory computer-readable storage device of claim 7, wherein determining that the user contact with the touchscreen display switched from including the single finger to including the multiple fingers includes determining that the user contact with the touchscreen switched from including the single finger in contact with the touchscreen display to including the multiple fingers that are in contact with the touchscreen display and that are determined to be adjacent to each other.

9. The non-transitory computer-readable storage device of claim 7, wherein:
displaying the indication that text between the first word and the second word is selected as individual characters involves indicating that a portion of the second word is selected in distinction to the second word being indicated as fully selected; and
displaying the indication that text between the first word and the second word is selected as whole words involves indicating that the second word is indicated as fully selected, even though the multiple fingers contact the touchscreen display at a location that corresponds to a middle of the second word.

10. The non-transitory computer-readable storage device of claim 7, wherein displaying the indication that text between the first word and the second word is selected as individual characters includes: (i) changing a color of the text between the first word and the second word, (ii) changing a shape of the text between the first word and the second word, or (iii) highlighting the text between the first word and the second word.

11. The non-transitory computer-readable storage device of claim 7, wherein the operations further comprise, displaying an indication that the text that is contacted by the single finger during the movement of the single finger from the first word to the second word is selected on a character-by-character basis or a word-by-word basis depending on whether the user contact with the touchscreen display includes the single finger or the multiple fingers during the movement of the user contact with the touchscreen display from the first word to the second word.

12. The non-transitory computer-readable storage device of claim 7, wherein the operations further comprise, after the user contact with the touchscreen display has released from contact with the touchscreen display at a releasing location of the touchscreen display, receiving an indication that a second user input contacted a displayed indication that the text between the first word and the releasing location of the touchscreen display was selected, and as a result, pasting over, copying, or cutting the text between the first word and the releasing location of the touchscreen display.

\* \* \* \* \*